United States Patent [19]

Galli et al.

[11] Patent Number: 4,824,626

[45] Date of Patent: Apr. 25, 1989

[54] PROCESS FOR THE REPRODUCTION OF WORKS OF ART OF LITHOID MATERIAL

[75] Inventors: Guglielmo Galli, Florence; Adolfo Pasetti, Milan, both of Italy

[73] Assignee: Ausimont S.p.A., Milan, Italy

[21] Appl. No.: 25,673

[22] Filed: Mar. 13, 1987

[30] Foreign Application Priority Data

Mar. 14, 1986 [IT] Italy .............................. 19761 A/86

[51] Int. Cl.[4] .................. B29C 33/40; C10M 141/00; C10M 145/18

[52] U.S. Cl. ...................................... 264/130; 252/54; 264/133; 264/226

[58] Field of Search ........................ 264/220, 225–227, 264/130, 133, 134; 252/11, 54

[56] References Cited

U.S. PATENT DOCUMENTS

| | | | |
|---|---|---|---|
| 1,792,486 | 2/1931 | Feinberg | 264/227 X |
| 3,379,812 | 4/1968 | Yakovou | 264/227 |
| 3,565,978 | 2/1971 | Folger et al. | 264/220 X |
| 4,285,744 | 8/1981 | Rudolf et al. | 264/220 X |
| 4,288,058 | 9/1981 | Inman | 264/225 X |
| 4,472,290 | 9/1984 | Caporiccio et al. | 252/51.5 R |
| 4,523,039 | 6/1985 | Lagow et al. | 568/615 |

FOREIGN PATENT DOCUMENTS

| | | | |
|---|---|---|---|
| 0148482 | 7/1985 | European Pat. Off. . | |
| 2215282 | 5/1973 | Fed. Rep. of Germany | 264/225 |
| 2566709 | 1/1986 | France | 264/220 |

*Primary Examiner*—Jan H. Silbaugh
*Assistant Examiner*—Karen D. Kutach
*Attorney, Agent, or Firm*—Stevens, Davis, Miller & Mosher

[57] ABSTRACT

A process for the reproduction of works of art made of a lithoid material including the use of a silicone rubber to obtain a negative mold of the work of art, wherein a thin layer of a fluorinated grease, based on polytetrafluoroethylene and a liquid perfluoropolyether, is first applied to the work of art.

7 Claims, No Drawings

PROCESS FOR THE REPRODUCTION OF WORKS OF ART OF LITHOID MATERIAL

BACKGROUND OF THE INVENTION

The present invention relates to the reproduction of sculptures in lithoid material, terracotta or stucco. It is known to reproduce the sculptures of modelling scagliola gypsum into nogs, the overlap of which allows obtaining the negative mould of the work of art.

On the modelled or sculptured surfaces of the work of art, aqueous solutions containing high concentrations of soaps, or oils and/or greases are applied, before the mould being modelled, in order to obtain an easier release of the gypsum nogs.

This method or reproduction has the drawback of not only being a procedure requiring a long time, but, above all, of causing an alteration of the surfaces of the work of art, in that the used oils, greases and soaps are absorbed by the material constituting the work of art, and the following washing cannot completely remove such substances, since said materials are absorbed by the lithoid material.

Remarkable improvements relatively to the above-indicated operating way have been obtained by using silicone rubbers as a material to model the negative mould instead of gypsum.

By this technique, a very faithful reproduction, even of the very minor details of the work of art, and an easy release are obtained, and the times required by this process are much shorter than by the gypsum modelling.

However, this modelling method shows the drawback of leaving an oily residue, incompatible with the aesthetical requirements of the work of art.

In fact, this residue results to be no longer removable by the solvents used to remove the silicones, which are, at the same time, compatible with the work of art.

Said oily residues remain on the work of art, causing changes in colour, or changes in the visual appearance.

Furthermore, the residues create complications in the subsequent restorations, in that, with time, they are absorbed by the work of art.

THE PRESENT INVENTION

The object of the invention is therefore a process for the reproduction of works of art in lithoid material, with the use of silicone rubbers to obtain the negative mould of the works of art, characterized in that on the work of art a thin layer of fluorinated grease based on polytetrafluoroethylene and of a liquid perfluoropolyether having neutral terminals is applied.

Any liquid perfluoropolyether can be used in the formulation of the grease, according to known methods described in the art.

In general, the perfluoropolyethers suitable for manufacturing the grease have a kinematic viscosity at 20° C. from 20 to 6000; also particular perfluoroethers having a viscosity from 40 to 30,000 can be used. Preferably, perfluoropolyethers having a viscosity from 500 to 2000 can be used.

The perfluoropolyethers which can be used are commercial product known as FOMBLIN Y, FOMBLIN Z, KRYTOX, or those disclosed in publ. Eur. Appln. No. 148,482 (Daikin) and in U.S. Pat. No. 4,523,039 (Lagow).

The products known as FOMBLIN Y comprise polyoxyfluoroalkylene units $$\begin{array}{l} CF_2-CFO \\ \qquad\;\; | \\ \qquad\;\; CF_3 \end{array}$$

and $CF_2O$, FOMBLIN Z $CF_2CF_2O$ and $CF_2O$ units, the KRYTOX products $$\begin{array}{l} CF_2-CFO \\ \qquad\;\; | \\ \qquad\;\; CF_3 \end{array}$$

units, Daikin products $CF_2CF_2CF_2O$ units and Lagow products $CF_2CF_2O$ units; furthermore, mixed perfluoropolyethers constituted by combinations of the above-indicated units, in particular $$\begin{array}{l} CF-CFO, \\ \qquad | \\ \qquad CF_3 \end{array}$$

$CF_2CF_2O$, $CF_2O$, can be used.

The fluorinated greases based on polytetrafluoroethylene which can be used are those formulated as described by J. Messina, J. Am. Soc. Lubr. Eng. (December 1969) 475–481, or in Italian Pat. No. 963,579.

Preferably used are fluorinated greases based on polytetrafluoroethylene, prepared according to as disclosed in publ. It. Pat. Appln. No. 21,590 A/82.

Examples of marketed greases which can be used are FOMBLIN RT, UT 18, OT 20. The layer of grease which is applied is generally in form of a thin layer.

In any case, the washing has the only purpose of removing the thickener contained in the grease; on the contrary completely removing the perfluoropolyether, which, as well-known, has a protective effect, is not necessary.

It has been furthermore found that the residual perfluoropolyether does not lead to any drawbacks as regards the colour and the aesthetical appearance.

In general, as solvents to remove the grease, a perfluorinated or perchlorinated grease is used. Preferably, commercial products known under the trademark ALGOFRENE®, having a boiling point comprised within the range of from 20° to 80° C., are used.

After the separation of the modelling material, the layer of fluorinated grease is removed by using a chlorofluorocarbon solvent, such as, e.g., 1,1,2-trichloro-1,2,2-trifluoroethane, which removes completely the grease, without leaving appreciable residual traces. The total removal of the fluorinated grease is evidenced by an I.R. spectrum, in which the typical absorption of carbon-fluorine bonds is not present.

The following Examples are given to the purpose of only illustrating and not limiting the invention.

EXAMPLE 1

Two specimens of "Pietra Serena" (sandstone) of 10×10×1 cm are used; on specimen A, without any treatments being carried out, a layer is spread of about 0.5 cm in thickness of liquid silicone rubber, which after about 60 minutes crosslinks to a solid mass.

On specimen B, a layer of FOMBLIN RT 15® grease is uniformly spread, in an amount corresponding to 100 g/m$^2$. Subsequently, the layer of silicon rubber is spread as on speciman A.

After 24 hours the layers of silicone rubber are removed from the two specimens by tearing.

The results obtained are the following:

Specimen A: The surface shows traces of crosslinked polymeric substance, not removable by the usual solvents of the silicone products (ketone-alcohol blends). This material, scraped off, analyzed on I.R. spectrum, shows the typical signals of a silicone rubber.

Specimen B: The surface has an oily appearance due to the presence of the fluorinated grease; by wiping with cotton wool soaked with trichlorotrifluoroethylene and subsequently washing by brushing with the same solvent, the components of the fluorinated grease are removed; by evaporation of the solvent used in the prior washing operations, a waxy residue is obtained, which on I.R. shows the typical absorption of carbon-fluorine bond; by scraping of the specimen surface, a powder is obtained, which, on I.R., is shown to not contain carbon-fluorine bonds.

EXAMPLE 2

The tests of Example 1 are repeated, by using specimens of Carrara statutory marble (white microcrystalline marble). Results similar to those of Example 1 are obtained.

EXAMPLE 3

The tests of Example 1 are repeated, by using specimens of Verone red marble. Results similar to those of Example 1 are obtained.

What is claimed is:

1. In a process for the reproduction of works of art of lithoid material comprising using a silicone rubber negative mold of the work of art, the mold being obtained by coating the work of art with the silicon rubber, the improvement consisting essentially in applying a thin layer of a fluorinated grease, based on polytetrafluoroethylene and on a liquid perfluoropolyether having neutral terminals, on the work of art before coating the work of art with the silicon rubber, removing the mold from the work of art, and removing the layer of grease from the work of art without leaving appreciable residual traces of the grease thereon.

2. Process according to claim 1, wherein the perfluoropolyether has a kinematic viscosity at 20° C. within the range of from 20 to 6000 cSt.

3. Process according to claim 1, wherein the perfluoropolyether contains the following repetitive perfluorooxyalkylene units:

$$CF_2{-}\underset{\displaystyle CF_3}{\underset{|}{CF}}{-}O \text{ and } CF_2O$$

4. Process according to claim 1, wherein the perfluoropolyether contains the repetitive units of $CF_2CF_2O$ and $CF_2O$ type.

5. Process according to claim 1, wherein the perfluoropolyether comprises the repetitive units $CF_2CF_2CF_2O$.

6. Process according to claim 1, wherein the perfluoropolyether comprises the repetitive units $CF_2CF_2O$.

7. Process according to claim 1, wherein the perfluoropolyether comprises the repetitive units $$CF_2{-}\underset{\displaystyle CF_3}{\underset{|}{CF}}{-}O,$$

$CF_2CF_2O$, $CF_2O$.

* * * * *